United States Patent
Eguchi et al.

(10) Patent No.: US 6,776,739 B2
(45) Date of Patent: Aug. 17, 2004

(54) VEHICULAR POWER-TRANSMISSION CONTROL SYSTEM

(75) Inventors: Takahiro Eguchi, Wako (JP); Masaaki Yamaguchi, Wako (JP); Atsushi Matsubara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 23 days.

(21) Appl. No.: 10/234,702

(22) Filed: Sep. 5, 2002

(65) Prior Publication Data

US 2003/0073540 A1 Apr. 17, 2003

(30) Foreign Application Priority Data

Oct. 17, 2001 (JP) .......................................... 2001-318946

(51) Int. Cl.[7] .............................................. B60K 41/02
(52) U.S. Cl. .................................. 477/107; 477/5; 477/6
(58) Field of Search ............................. 477/5, 6, 8, 39, 477/45, 50, 107, 110, 102

(56) References Cited

U.S. PATENT DOCUMENTS

| | | | |
|---|---|---|---|
| 4,923,042 A | * | 5/1990 | Yamabe et al. ................ 477/54 |
| 5,303,614 A | * | 4/1994 | Sakaki et al. ................ 477/158 |
| 6,344,016 B1 | * | 2/2002 | Eguchi ........................ 477/175 |

FOREIGN PATENT DOCUMENTS

| | | | | |
|---|---|---|---|---|
| JP | 362268744 | * | 11/1987 | .................. 477/39 |
| JP | 403265758 | * | 11/1991 | .................. 477/62 |
| JP | 3011069 | | 12/1999 | |
| JP | 2000-272380 | | 10/2000 | |

* cited by examiner

Primary Examiner—Ha Ho
(74) Attorney, Agent, or Firm—Arent Fox PLLC (57) ABSTRACT

A vehicular power-transmission control system comprises a continuously variable transmission CVT, which transmits the output of an engine E to wheels, a starting clutch 5, which controls the transmission of power in the continuously variable transmission, an electrical motor generator M, which can assist the engine in rotational drive, and a hydraulic pump P, which is connected to the output shaft of the engine. When the vehicle, which has come into a halt with the engine consequently stopped in an idling elimination control, is to be restarted, the power-transmission control system controls the electrical motor generator to rotate the output shaft of the engine, to which fuel supply is not allowed, thereby to drive the pump. Thereafter, when the starting clutch receiving a hydraulic pressure from the hydraulic pump starts its engagement, the power-transmission control system starts the operation of the engine.

7 Claims, 6 Drawing Sheets

VEHICULAR POWER-TRANSMISSION CONTROL SYSTEM

FIELD OF THE INVENTION

The present invention relates to a control system for controlling power transmission through a power transmission system that is capable of performing an engine-idling elimination control when the vehicle comes into a halt. Furthermore, the present invention relates particularly to a power-transmission control system characterized in a control that restarts the vehicle by engaging a starting clutch after restarting the engine, which has stopped in the idling elimination control.

BACKGROUND OF THE INVENTION

Generally, automobiles include a construction for transmitting the driving force of an engine to wheels through a power transmission. Additionally, for the purpose of improving fuel economy, many vehicles nowadays are equipped with an idling elimination control, in which the operation of the engine is stopped when the vehicle comes into a halt (refer to, for example, Japanese Patent Publication No. 3011069 and Japanese Laid-Open Patent Publication No. 2000-272380).

Generally, a power transmission comprises a hydraulically operated frictionally engaging element (hydraulic clutch, hydraulic brake, etc.), which is used to control the transmission of the driving force of an engine to wheels. In a case where an idling elimination control is executed with the power transmission, when the operation of the engine is stopped, the hydraulic pump that supplies a hydraulic pressure to the frictionally engaging element stops, and therefore, the frictionally engaging element itself also stops because of the construction of the transmission, in which the pump is driven by the engine. For starting the vehicle, when the engine is restarted from the stopped condition in the idling elimination control, the engine being started drives the pump again, which supplies the hydraulic pressure to the frictionally engaging element. Here, the start of the engagement of the frictionally engaging element follows the start of the engine. Because of the delay of the engagement of the frictionally engaging element with respect to the starting of the engine, immediately after the restarting of the engine and before the real engagement of the frictionally engaging element, an engine racing can occur, which impairs the driving performance of the vehicle.

To solve this problem, the power transmission system disclosed in Japanese Patent Publication No. 3011069 includes electricity-generating electrical motor means (electrical motor generator). For starting the vehicle, when the engine is restarted from the stopped condition in the idling elimination control, the electrical motor generator is actuated to load the engine (to generate electricity), thereby preventing any occurrence of engine racing. Also, the system disclosed in Japanese Laid-Open Patent Publication No. 2000-272380 is equipped with a control to restrain the output of the engine when the engine is restarted from the stopped condition in the idling elimination control until the engagement of the frictionally engaging element starts. Specifically, in this control, the throttle of the engine is kept closed to restrain fuel supply for prevention of engine racing.

However, in the system disclosed in Japanese Patent Publication No. 3011069, if the vehicle in the idling elimination control were stopped and started repeatedly, the electrical motor generator would heat up or could even overheat. Such an action can reduce the durability of the motor generator. Therefore, if the electrical motor generator heats up, then a safety device is actuated to prohibit the idling elimination control. This results in a reduced fuel efficiency. By the way, the electrical motor generator is to assist the driving force of the engine when the vehicle is started. If the electrical motor generator is used to prevent engine racing as described above, then the electrical motor generator must be controlled to prevent engine racing and then to assist the engine. However, it is difficult to determine a correct or right timing for the operation of the electrical motor generator to be switched from the former aspect to the latter in this control. If this timing is not right and delayed, then the driving performance of the vehicle is impaired.

On the other hand, the system disclosed in the above mentioned Japanese Laid-Open Patent Publication No. 2000-272380 requires a controller that controls the engine throttle independently from the operation of the accelerator pedal. Because of this requirement, the engine control system is complicated. In this system, it is necessary to quickly bring the throttle opening of the engine to a degree that corresponds to the operation of the accelerator pedal immediately after the start of the engagement of the frictionally engaging element. As a result, the driver may feel that something is not right.

SUMMARY OF THE INVENTION

To solve the above mentioned problems, it is an object of the present invention to provide a power-transmission control system which enables a vehicle to start smoothly without engine racing after the engine has been stopped in an idling elimination control.

To achieve this objective, the present invention provides a vehicular power-transmission control system which comprises an engine, a drive-power transmission (for example, the belt-type continuously variable transmission CVT described in the following embodiment), a hydraulically actuated frictionally engaging element (for example, the starting clutch 5, the forward clutch 25 and the reverse brake 27 described in the following embodiment), an electrical motor (for example, the electrical motor generator M described in the following embodiment) and a hydraulic pump. The engine is controlled to stop when the vehicle comes into a halt in an idling elimination control, and the drive-power transmission transmits a rotational driving force from the engine to wheels. The hydraulically actuated frictionally engaging element controls the transmission of the rotational driving force in the drive-power transmission, and the electrical motor is provided closer to the engine than to the frictionally engaging element and can assist the rotational drive of the engine. The hydraulic pump is connected to the output shaft of the engine, and it is to supply an engagement-actuating pressure to the frictionally engaging element. The power-transmission control system performs the following control to restart the vehicle, which has come into a halt with the engine consequently stopped in the idling elimination control. The control system makes the electrical motor to rotate the output shaft of the engine, to which fuel supply is not allowed in this instance. By the rotation of the output shaft driven by the electrical motor, the hydraulic pump is operated to supply a hydraulic pressure to the frictionally engaging element. When the frictionally engaging element receiving the hydraulic pressure becomes ready for a transmission of power, the control system starts the operation of the engine, so that the engine can produce a torque. This control for starting the operation of the engine to produce a torque means either a control in which the engine is started when the frictionally engaging element has become ready for a power transmission, or a control in which the engine is started a little before the frictionally engaging element is ready for a power transmission, and when the frictionally engaging element becomes ready for a power transmission, the engine, which has already started, can provide a real driving torque.

According to a feature of this power-transmission control system, when the vehicle, whose engine has been stopped in the idling elimination control, is to be restarted, at first, the electrical motor drives the hydraulic pump, which is connected to the output shaft of the engine, which is not allowed to receive any fuel supply in this instance. In this condition, the frictionally engaging element receives oil discharged from the pump, and when the frictionally engaging element starts its engagement, the engine is started. After the frictionally engaging element has become ready for a power transmission (i.e., it has just started its engagement), the output of the engine is transmitted through the frictionally engaging element to the wheels to start the vehicle. In this way, the vehicle can be started smoothly without any engine racing. In this case, the electrical motor is used only for driving the hydraulic pump and for rotating the engine idly, so there is no possibility of the electrical motor being heated up excessively. Therefore, this electrical motor can be miniaturized in the design. In addition, if the electrical motor is kept operating even after the start of the engine, then the electrical motor can be controlled to assist the engine for driving the vehicle. This is advantageous for improving the driving performance of the vehicle. As no fuel is supplied in the initial stage of the control, this fact contributes to a fuel efficiency improvement.

Also, the suction and exhaust valves of the cylinders of the engine may be constructed to be capable of being kept closed. With this arrangement, when the vehicle, which has come into a halt with the engine consequently stopped in the idling elimination control, is to be restarted, while the hydraulic pump is being driven by the electrical motor in operation (i.e., while no fuel is being supplied to the engine), preferably, at least some of the suction and exhaust valves are kept closed. As a result, while the output shaft of the engine is being rotated by the electrical motor (while the engine is rotated idly), no or little fresh air enters the cylinders. This arrangement helps the exhaust gas to be kept clean at the time when the engine is activated. Furthermore, by keeping the suction and exhaust valves closed, the pumping loss, which would occur otherwise at a large degree if the air were allowed to flow through the passages of the suction and exhaust valves as the pistons reciprocate in the cylinders, is maintained at a small degree. This reduced loss leads to a reduced electricity consumption as the driving torque required of the electrical motor becomes small. In addition, because there is no opening and closing of the suction and exhaust valves, the vibration of the engine is comparatively small.

According to another feature of the present invention, another vehicular power-transmission control system comprises an engine, which can be controlled to stop when the vehicle comes into a halt in an idling elimination control, a drive-power transmission, which transmits a rotational driving force from the engine to wheels, a hydraulically actuated frictionally engaging element, which controls the transmission of the rotational driving force in the drive-power transmission, and a hydraulic pump, which is driven by the engine to supply an engagement-actuating pressure to the frictionally engaging element. This power-transmission control system performs the following control to restart the vehicle, which has come into a halt with the engine consequently stopped in the idling elimination control. The control system makes the engine to start in a condition where the output of the engine is reduced by an ignition-timing shift. After the frictionally engaging element receiving the hydraulic pressure from the hydraulic pump becomes ready for a transmission of power, and when the frictionally engaging element starts its engagement operation, the ignition timing of the engine is reset to a normal condition.

According to this power-transmission control system, to start the engine, which has been stopped in the idling elimination control, for restarting the vehicle, at first, the engine is started in an ignition-timing shift (for example, the ignition timing is delayed) for limiting the output of the engine. As a result, the engine starts without any engine racing, and the hydraulic pump being driven by the engine operated in this condition discharges oil, which is supplied to the frictionally engaging element. When the frictionally engaging element receiving the oil starts its engagement, the ignition timing of the engine is reset to a normal setting to increase the output of the engine to a normal level, so that the vehicle can be started smoothly. In this case, the rotational speed of the engine is controlled in correspondence to the operation of the accelerator pedal, so the driver feels no abnormality from the operation.

In this power-transmission control system, an electrical generator may be provided to the engine rather than to the frictionally engaging element, so that the electrical generator can be driven by the engine to generate electricity. While the engine is being operated in the ignition-timing shift as described above, the electrical generator can be driven by the engine to generate electricity. With this arrangement, as the engine having started in the ignition-timing shift has a reduced output, and as the engine in this condition is further restrained by the load of the electrical generator to generate electricity, the starting of the engine is securely protected from engine racing. In this case, when the frictionally engaging element receiving the oil discharged from the hydraulic pump actually starts its engagement, the ignition timing of the engine is reset to the normal setting, and the generation of electricity by the electrical generator is terminated. At this time, the output of the engine is reset to a normal level, so that the vehicle can be controlled to start smoothly. Also, in this case, the rotational speed of the engine is controlled in correspondence to the operation of the accelerator pedal, so the driver feels no abnormality. Furthermore, because the electrical generator is driven only by the engine producing a reduced output, the electrical generator never heats up excessively, so the switching of the electrical generator for the termination of electricity generation is performed smoothly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
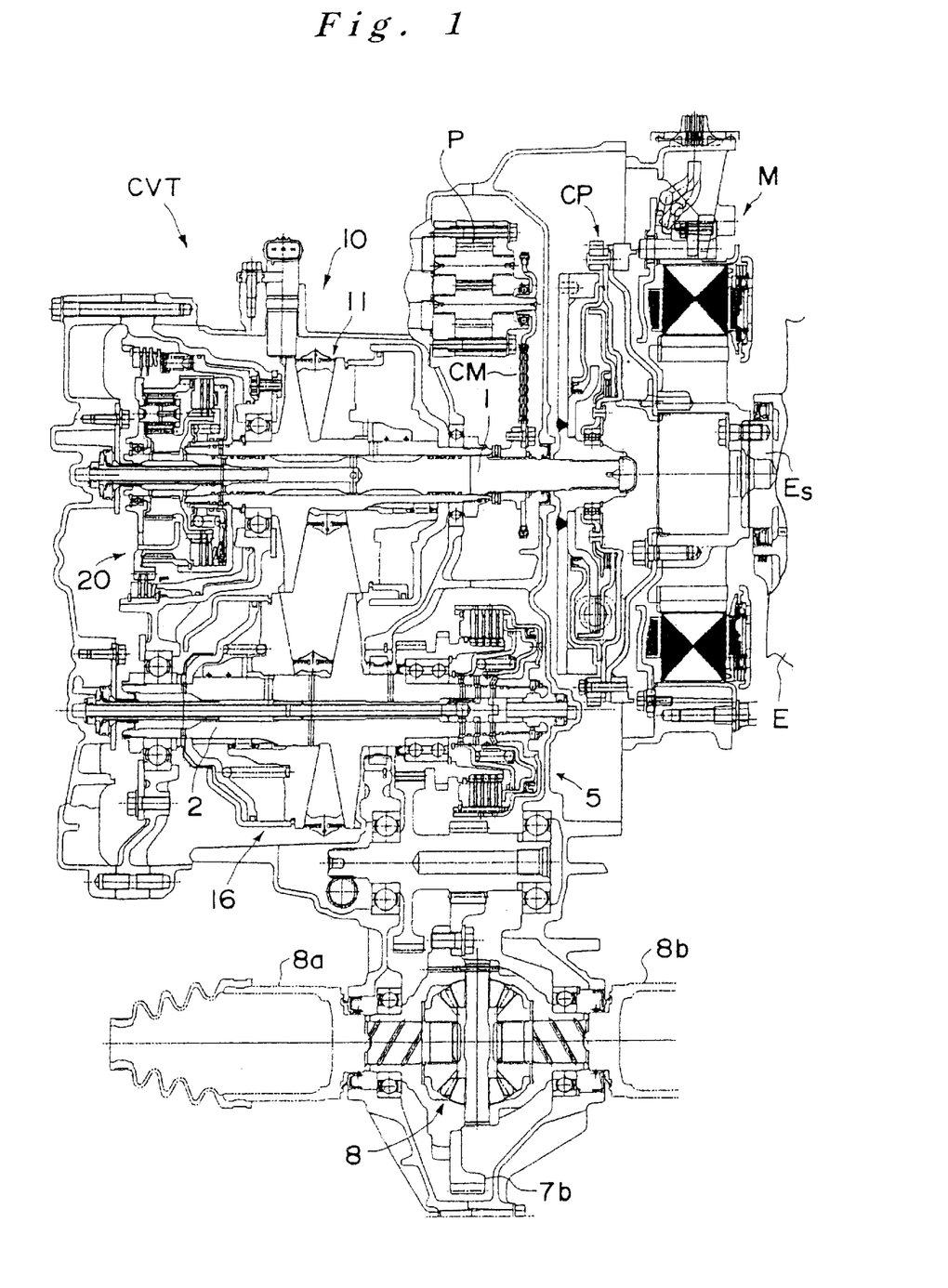
FIG. 1 is a sectional view describing the construction of a power transmission, which is controlled by a control system according to the present invention.
Figure 2:
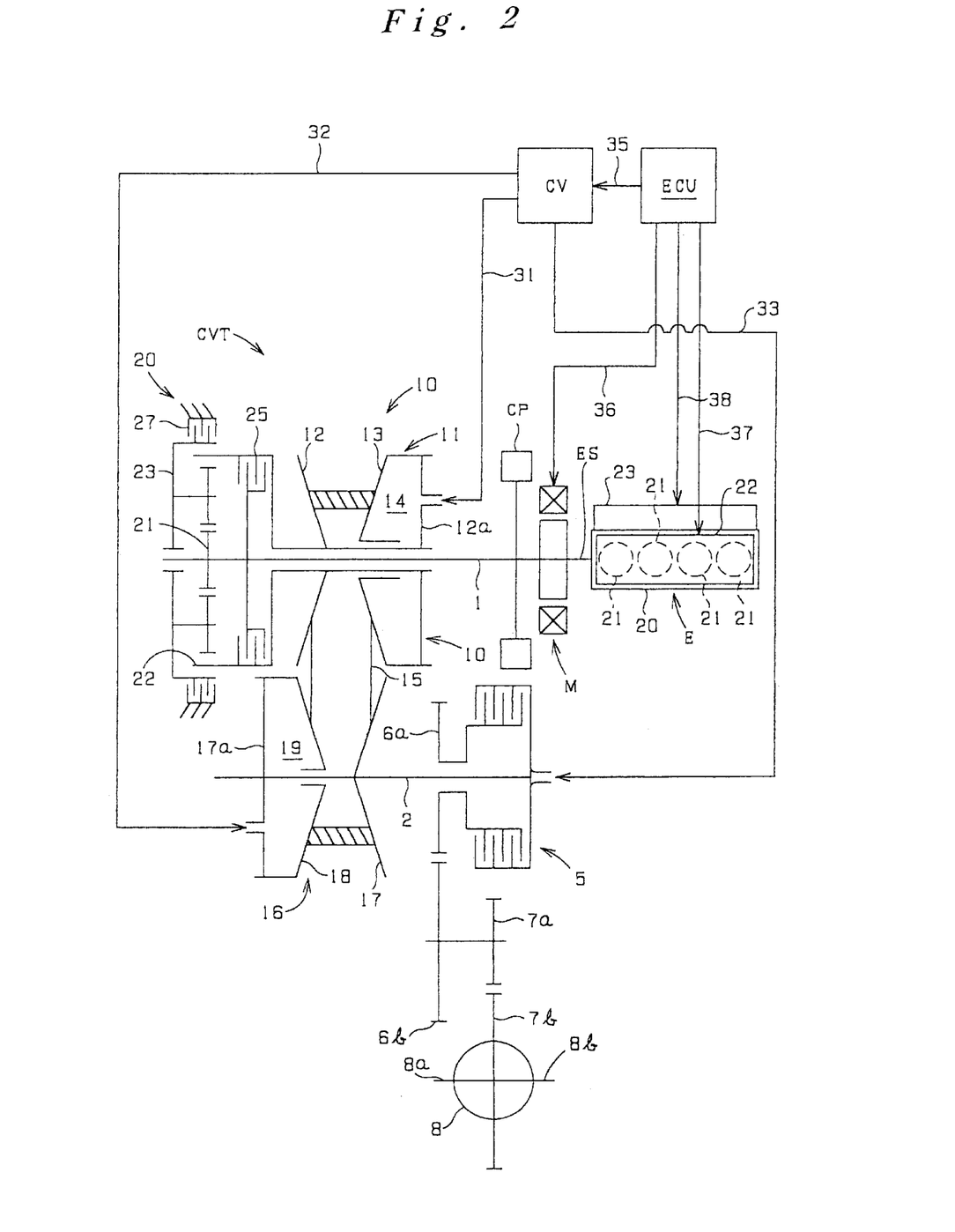
FIG. 2 is a schematic diagram describing the power transmission system of the power transmission.

A preferred embodiment according to the present invention is described in reference to the drawings. FIG. 1 is a sectional view describing the construction of a power transmission used for a vehicle, which power transmission is controlled by a control system according to the present invention, and FIG. 2 shows schematically the power transmission system of this power transmission. It is clear from these drawings that this power transmission comprises an engine E, an electrical motor generator M, which is connected to the output shaft Es of the engine E, and a belt-type continuously variable transmission CVT, which is connected through a coupling mechanism CP to the output shaft Es of the engine.

The engine E is a four cylinder reciprocating engine and has a piston in each of the four cylinder bores 21 formed in a cylinder block 20. The engine E is also equipped with a suction and exhaust controller 22, which controls the operation of the suction valves and the exhaust valves for each cylinder bore 21, and with a fuel injection and ignition controller 23, which controls the injection of fuel and the ignition for each cylinder bore 21. The electrical motor generator M assists the driving force of the engine when it is powered by a battery incorporated in the vehicle, and it charges the battery by generating electricity from the rotational drive received from the wheel side while the vehicle is in a deceleration (energy regenerating). Thus, this power transmission has a hybrid-type drive source.

The continuously variable transmission CVT comprises a metal V-belt mechanism 10, a forward/reverse switching mechanism 20 and a starting clutch (main clutch) 5. The metal V-belt mechanism 10 is disposed around the input shaft 1 and the countershaft 2 of the transmission, the forward/reverse switching mechanism 20 is disposed over the input shaft 1, and the starting clutch 5 is disposed on the countershaft 2. This continuously variable transmission CVT is mounted on a vehicle, and the input shaft 1 is connected through a coupling mechanism CP with the output shaft Es of the engine. The driving force output from the transmission is transmitted through the starting clutch 5 to a differential mechanism 8 and then used for driving axle shafts 8a and 8b to rotate right and left wheels of the vehicle (not shown). In addition, a hydraulic pump P is provided in the transmission housing and is connected to the input shaft 1 through a chain mechanism CM. Therefore, the hydraulic pump P is driven by the input shaft 1, which rotates at the same rotational speed as the output shaft Es of the engine, so that oil is supplied to a control valve CV as described in detail later in this section.

The metal V-belt mechanism 10 comprises a variable width drive pulley 11, which is disposed over the input shaft 1, a variable width driven pulley 16, which is disposed on the countershaft 2, and a metal V-belt 15, which is disposed around these pulleys 11 and 16. The drive pulley 11 comprises a stationary pulley half 12, which is disposed rotatably on the input shaft 1, and a movable pulley half 13, which is movable with respect to the stationary pulley half 12 in the axial direction of the pulley 11. On the lateral outside of the movable pulley half 13, a drive-pulley cylinder chamber 14 is defined by a cylinder wall 12a, and a pulley-control pressure supplied through a control valve CV and through an oil passage 31 into the cylinder chamber 14 generates a thrust which shifts the movable pulley half 13 in the axial direction of the drive pulley.

The driven pulley 16 comprises a stationary pulley half 17, which is fixed on the countershaft 2, and a movable pulley half 18, which is movable with respect to the stationary pulley half 17 in the axial direction of the pulley. On the lateral outside of the movable pulley half 18, a driven-pulley cylinder chamber 19 is defined by a cylinder wall 17a, and a pulley-control pressure supplied through the control valve CV and through an oil passage 32 into the cylinder chamber 19 generates a thrust which shifts the movable pulley half 18 in the axial direction of the driven pulley.

In this construction, the hydraulic pressures being supplied into these cylinder chambers 14 and 19 of the drive and driven pulleys, respectively, are controlled by the control valve CV to generate appropriate lateral thrusts in these two pulleys, so that there will be no slip of the belt 15. Furthermore, these pressures supplied into the cylinder chambers are controlled to create a difference in these lateral thrusts, so that the groove widths of these pulleys will change, adjusting the pitch radii of the respective pulleys for the V belt 15. In this way, the speed change ratio of the transmission is controlled to vary continuously without any step. These lateral thrusts, which are generated in the drive and driven pulleys for the ratio control, are generated from a line pressure that is adjusted by a regulator valve from the pressure of the hydraulic pump P, which is connected to the input shaft 1 through the chain mechanism CM. More specifically, the pressure of either the drive or driven cylinder chamber that is the higher of the two is produced from the line pressure.

The forward/reverse switching mechanism 20 is a planetary gear train, which comprises a sun gear 21, a ring gear 22, a carrier 23 and a forward clutch 25. The sun gear 21 is connected to the input shaft 1, and the ring gear 22 is connected to the stationary pulley half 12 of the drive pulley 11. The carrier 23 can be held against rotation by a reverse brake 27, and the forward clutch 25 can be operated to connect the sun gear 21 with the ring gear 22. In this mechanism 20, when the forward clutch 25 is engaged, all the gears 21, 22 and 23 rotate together with the input shaft 1 as a one body, and the drive pulley 11 is driven by the driving force of the engine E in the same direction as the input shaft 1 (i.e., in the forward direction of the vehicle). On the other hand, when the reverse brake 27 is engaged, the carrier 23 is held stationary, so the ring gear 22 rotates in the direction opposite to that of the sun gear 21, and the drive pulley 11 is driven by the driving force of the engine E in the direction opposite to that of the input shaft 1 (i.e., in the reverse direction). The engagement operation of the forward clutch 25 and the reverse brake 27 is controlled with a forward/reverse control pressure that is adjusted by the control valve CV from the line pressure.

The starting clutch 5 is a clutch to control the power transmission between the countershaft 2 and the output members of the transmission, i.e., power transmission gears 6a, 6b, 7a and 7b. In the condition where the starting clutch 5 is engaged, the output of the engine, after undergoing the speed ratio change by the metal V-belt mechanism 10, is transmitted through the gears 6a, 6b, 7a and 7b to the differential mechanism 8 and then divided and transmitted by the differential mechanism 8 to the right and left axle shafts 8a and 8b and then to the wheels. When the starting clutch 5 is released, this power transmission is terminated, so the transmission is in neutral condition. The engagement of the starting clutch 5 is controlled with a clutch control pressure that is adjusted by the control valve CV from the line pressure and supplied through an oil passage 33.

In this continuously variable transmission CVT, as described above, the pulley-control pressures supplied to the drive and driven pulleys from the control valve CV through the oil passages 31 and 32, respectively, are used for the speed ratio change control while the forward/reverse control pressure supplied to the forward clutch 25 and the reverse brake 27 from the control valve CV through an oil passage (not shown) is used for the forward/reverse switching control of the transmission. In addition, the clutch control pressure supplied from the control valve CV through the oil passage 33 is used for the starting clutch engagement control. For controlling these control pressures, the operation of the control valve CV, which receives oil from the hydraulic pump P, is controlled by means of control signals sent from an electrical control unit ECU.

In the vehicle incorporating this transmission, the electrical motor generator M assists the driving force of the engine E, so that the engine E can operate in a range which is most fuel efficient. To improve the fuel efficiency of the vehicle, the operation of the electrical motor M is controlled by means of control signals sent from the electrical control unit ECU through a control line 36. Simultaneously, the speed ratio change control is performed to achieve an optimal speed change ratio for operating the engine E in a most fuel efficient manner. This control is also executed by means of control signals sent from the electrical control unit ECU through a control line 35 to the control valve CV.

Furthermore, the engine E can be operated in a partial cylinder operation mode where some of the four cylinders are set in a stand-by condition when a predetermined condition is satisfied for the vehicle (for example, in a deceleration). More specifically, while the electrical control unit ECU controls the operation of the suction and exhaust controller 22 with control signals sent through a control line 37 and the operation of the fuel injection and ignition controller 23 through a control line 38, to operate the engine in a partial cylinder operation mode, it keeps suction and exhaust valves being closed for some cylinder bores 21 and inhibits these cylinders from receiving fuel injection and ignition. By operating the engine in this way, the fuel efficiency of the vehicle is improved especially during the vehicle's deceleration. In addition, the force of engine brake is made relatively small, so that the energy spent for the deceleration is regenerated effectively by the electrical motor generator M.

In this power transmission, additionally, an idling elimination control is performed to further improve the fuel efficiency. The idling elimination control is basically to stop the operation of the engine itself after the vehicle comes to a halt and when the driving force of the engine becomes unnecessary, i.e., the engine enters into an idling condition. In the idling elimination control executed for this power transmission, to achieve a higher level of fuel efficiency, specifically, when the accelerator pedal is released to decelerate the vehicle and to bring it into a halt, the fuel injection is terminated during the deceleration, and this condition for the engine is kept for elimination of engine idling.

In the power transmission, which has the above described construction, for the vehicle having been stopped in the idling elimination control, the engine is restarted to start the vehicle. Now, this starting control is described with respect to the flowchart of FIG. 3 and the time diagram of FIG. 4. In this control, at first, a determination is made at Step S1 whether an idling stop flag F(IS), which is set up when the engine is stopped in the idling elimination control, is up or not. If the idling stop flag is down, i.e., F(IS)=OFF, meaning that the engine is in operation, then the control flow ends here. Conversely, if the idling stop flag is up, F(IS)=ON, then the control flow proceeds to Step S2, where another determination is made whether or not an engine-start flag is up, i.e., F(ES)=ON. This engine-start flag is set up when the engine should be started to move the vehicle. If the engine-start flag is down, i.e., F(ES)=OFF, meaning that the engine does not start, then the control flow ends here.

Figure 3:
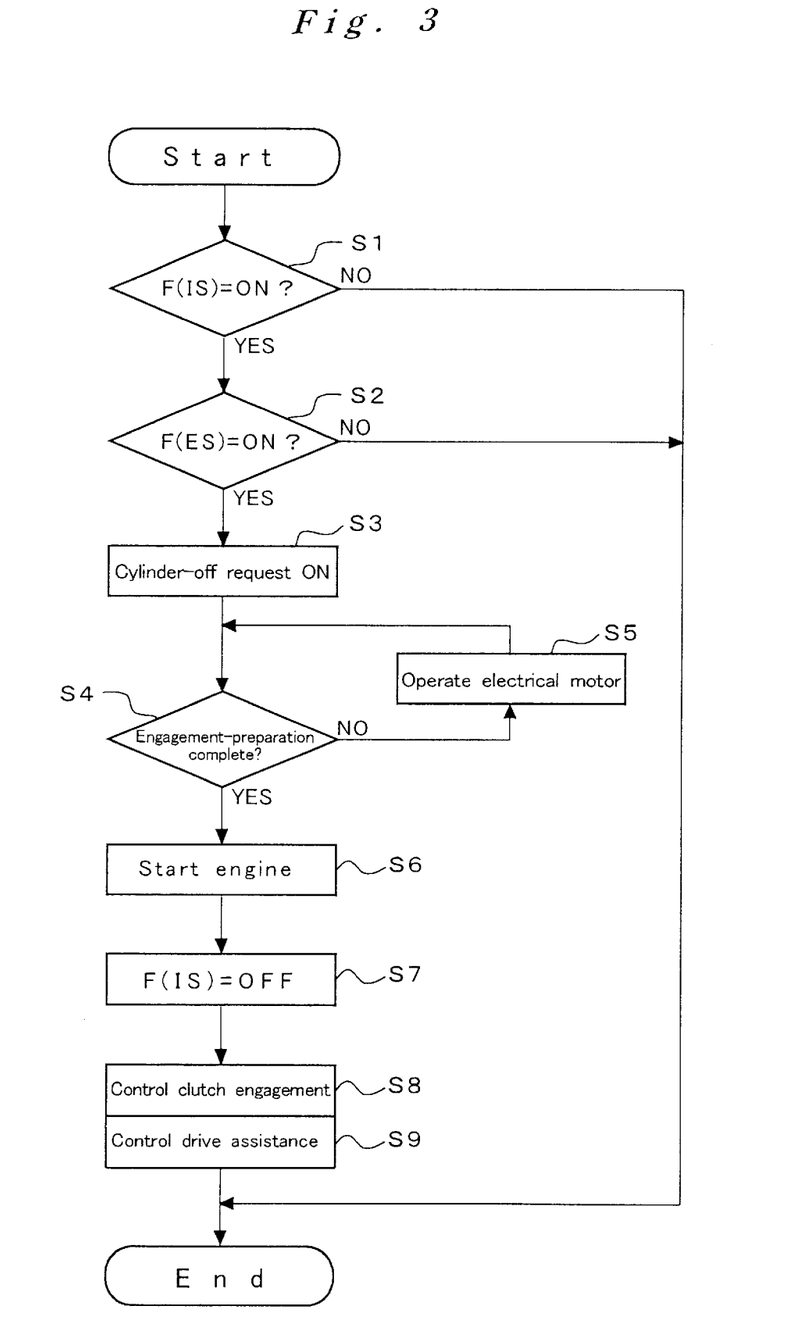
FIG. 3 is a flowchart showing control steps executed by the power-transmission control system according to the present invention.
Figure 4:
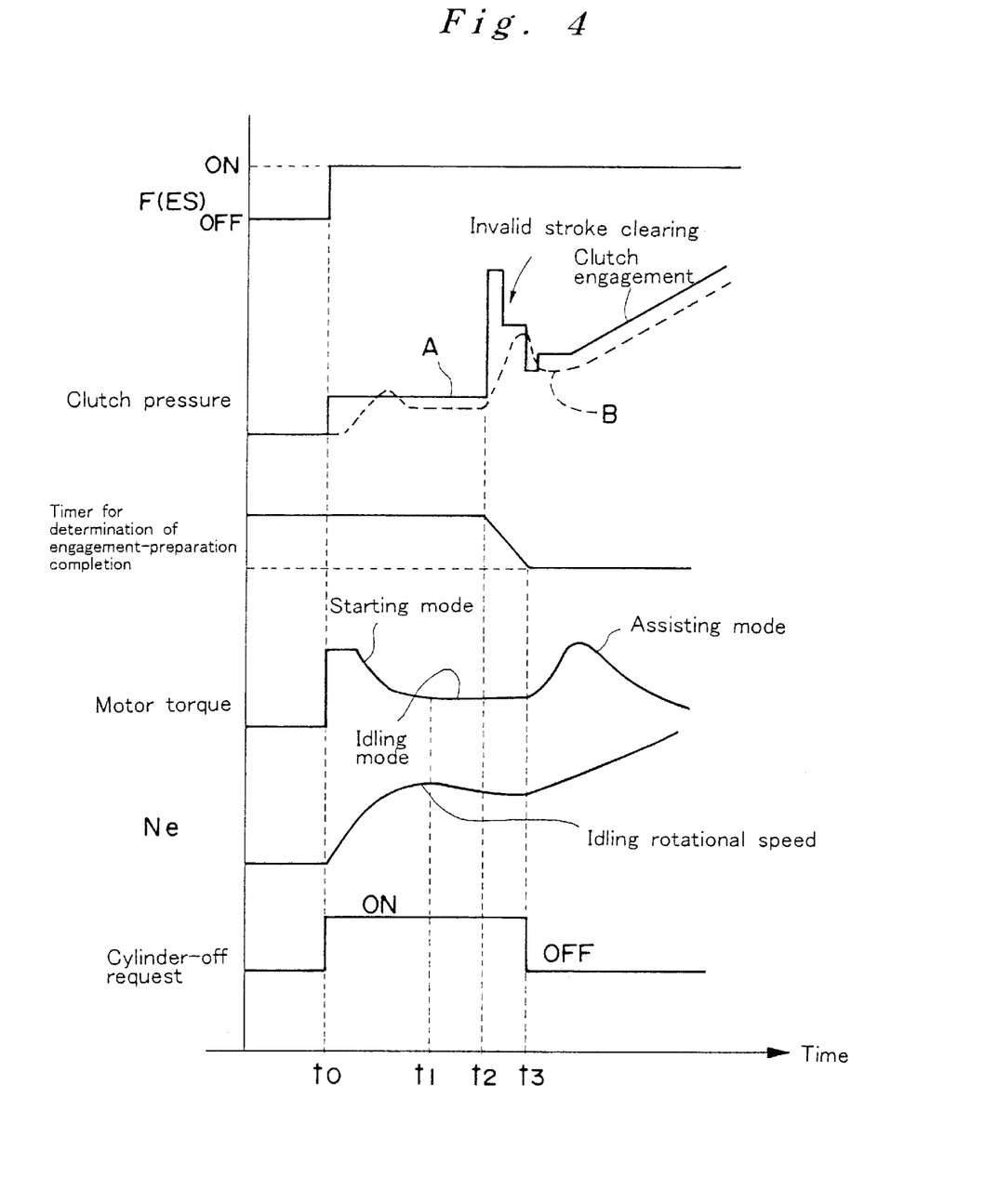
FIG. 4 is a time diagram showing chronological changes observed in various parameters during the operation of the control system.

Conversely, if the result of the determination at Step S2 is that the engine-start flag is up, i.e., F(ES)=ON, then a cylinder-off requesting control is started at Step S3, in which the suction and exhaust valves of the engine E are kept closed, and fuel injection and ignition are stopped. Then, the control flow passes through Step S4 to Step S5 until a determination at Step S4 gives a result that the preparation for the engagement of the clutch is complete. At Step S5, the electrical motor generator M is used as an electrical motor to rotationally drive the output shaft Es of the engine. For example, after the engine has stopped in the idling elimination control, the brake pedal is released, and then the accelerator pedal is pressed. As shown in FIG. 4, the engine-start flag is set up, i.e., F(ES)=ON, at time t0. From this point, the cylinder-off control is executed for the engine, and the electrical motor generator M is started at time t0.

After the suction and exhaust valves have been closed by the cylinder-off control, the electrical motor generator M drives the output shaft Es of the engine. In this way, the friction torque of the engine E is made small to minimize the consumption of electricity by the electrical motor generator M. Also, no fresh air is sucked into the cylinders of the engine. This helps clean the exhaust gas produced at the time of the activation of the engine E. The operation of the electrical motor generator M is set in a start-up mode during the time period from time t0 to time t1, where it generates a starting torque to increase the rotational speed of the output shaft Es of the engine, and then, set in an idling mode for the time period from time t1 to time t2, where the electrical motor generator M drives the output shaft Es of the engine idly. As a result, the motor torque of the electrical motor generator M is controlled as shown in FIG. 4. In response, the rotational speed Ne of the output shaft Es of the engine driven by the electrical motor generator M increases gradually to a predetermined idling rotational speed, and this rotational speed Ne is maintained at constant for a while.

In the control valve CV, a linear solenoid valve (not shown, but it is provided in the control valve CV), which produces the clutch pressure Pc supplied to the starting clutch 5 through the oil passage 33, is actuated at time t0, when the engine-start flag is set up, i.e., F(ES)=ON, and controlled thereafter as shown in FIG. 4. Specifically, in this control, the linear solenoid valve receives control signals that are to produce changes in the clutch pressure Pc as indicated in real line A in the time diagram. However, actual changes that appear in the clutch pressure Pc are as indicated in broken line B. Here, as the rotational speed of the output shaft Es of the engine starts increasing from time t0 toward the idling rotational speed as mentioned above, the rotation of the input shaft 1, which is connected and rotated together at the same rotational speed with the output shaft Es, is transmitted through the chain mechanism CM to the hydraulic pump P, driving the pump P. As a result, the oil discharged from the pump P is supplied to the control valve CV, which is then supplied from the linear solenoid valve through the oil passage 33 to the starting clutch 5. More specifically, the oil from the pump is supplied through the linear solenoid valve directly to the starting clutch 5 initially until the oil passage 33 and the oil chamber of the starting clutch 5 are filled with the oil. After the fulfillment thereof, the determination at Step S4 results in that the engagement preparation for the starting clutch 5 is complete (time t2). This determination is executed by detecting a counter electromotive force that arises in the solenoid of the linear solenoid valve in response to a change in the hydraulic pressure supplied from the linear solenoid valve.

After the completion of the engagement preparation of the starting clutch 5 (time t2), the control flow proceeds to Step S6, where the engine E is controlled to start. In this control, after the elapse of the time set on a timer for the determination of the engagement preparation completion from time t2, i.e., at time t3, the cylinder-off requesting control is terminated to start the engine E, and the idling stop flag is set down, i.e., F(IS)=OFF, at Step S7. Thereafter, the rotational speed of the engine E increases in correspondence to the pressing of the accelerator pedal as shown in FIG. 4. In this instance, if the driving force of the engine is not sufficient, then the engine E is assisted by the electrical motor generator M to secure a desired starting performance at Step S9.

Also, after the completion of the engagement preparation of the starting clutch 5 at time t2, the linear solenoid valve receives a control signal that increases the clutch pressure rapidly as shown in FIG. 4 at Step S8. This is to quickly clear the invalid stroke of the piston in the starting clutch 5. As a result, the starting clutch 5 is cleared of the invalid stroke to start the real engagement. Thereafter, the clutch pressure is controlled to increase gradually.

The control to start the engine, which has been stopped in the idling elimination control, is executed in the above described steps, namely, at first, the output shaft Es of the engine in the cylinder-off control is driven by the electrical motor generator M, and after the completion of the engagement preparation of the starting clutch 5, the engine is started. In this way, the starting clutch 5 is engaged smoothly without engine racing, so that the vehicle is started smoothly. In the above described control, after the completion of the engagement preparation of the starting clutch 5, the engine E is started. However, the engine E may be controlled to start after the completion of the invalid-stroke clearing of the starting clutch 5. Preferably, the starting of the engine may be timed to come a little before the completion of the engagement preparation of the starting clutch 5 or the completion of the invalid-stroke clearing of the starting clutch 5, so that the engine E can provide a driving torque at the time when the engagement preparation of the starting clutch 5 comes to completion, or the invalid-stroke clearing of the starting clutch 5 comes to completion.

Figure 5:
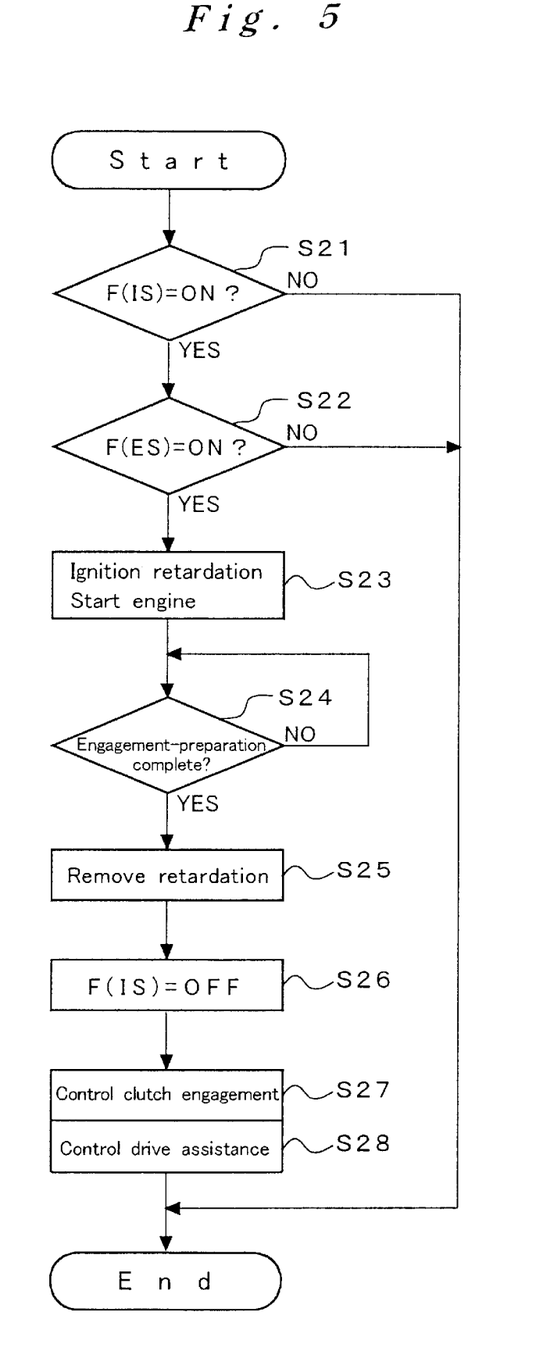
FIG. 5 is a flowchart showing control steps executed by another power-transmission control system as another embodiment according to the present invention.
Figure 6:
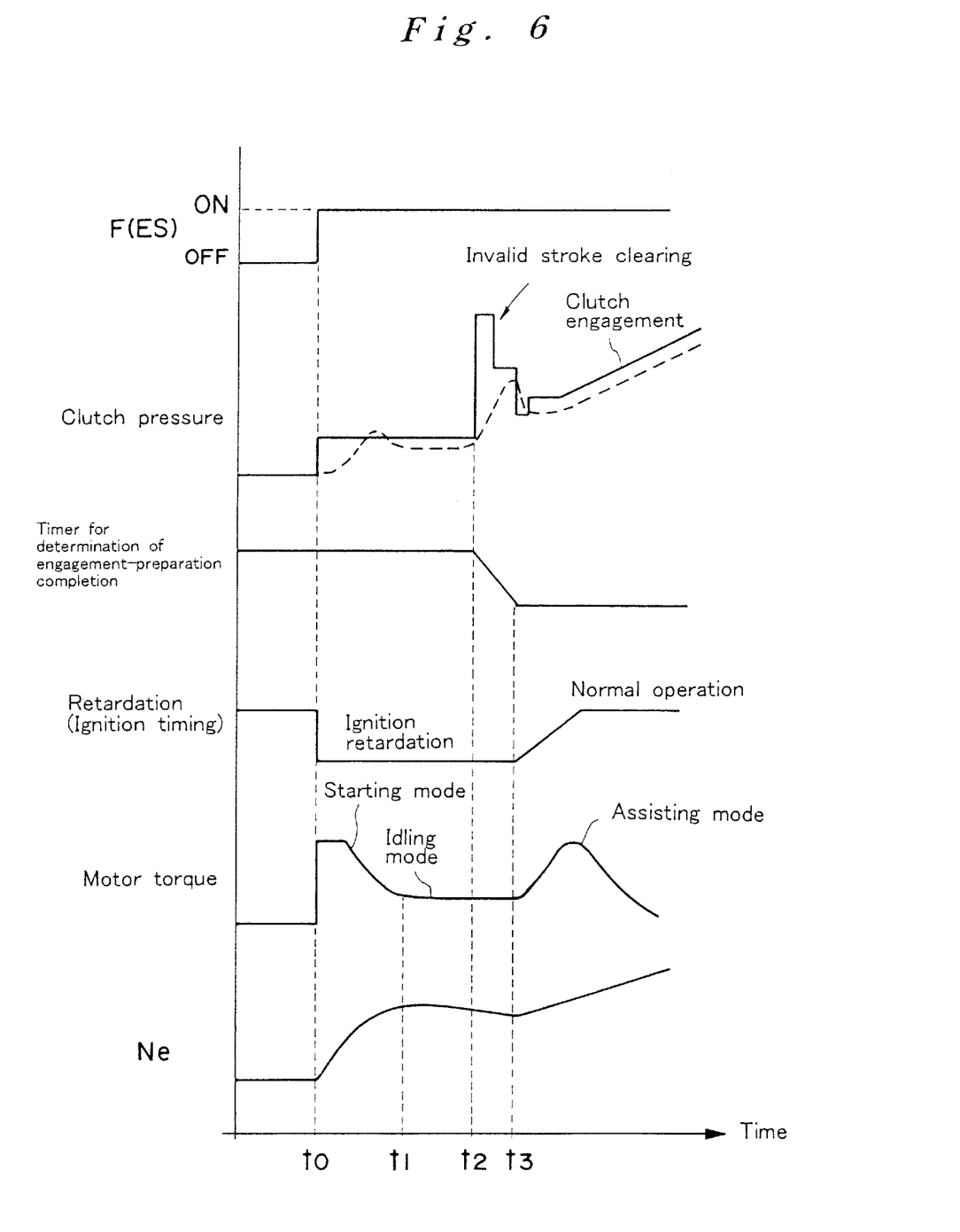
FIG. 6 is a time diagram showing chronological changes observed in various parameters during the operation of this second control system.

Now, another control for starting the engine to start the vehicle, which has been stopped in the idling elimination control, is described with respect to the flowchart of FIG. 5 and the time diagram of FIG. 6. Also, in this control, at first, a determination is made whether the idling stop flag is up, i.e., F(IS)=ON, or not at Step S21. If the idling stop flag is down, i.e., F(IS)=OFF, meaning that the engine is in operation, then the control flow ends here. Conversely, if the idling stop flag is up, F(IS)=ON, then the control flow proceeds to Step S22, where another determination is made whether the engine-start flag is up, i.e., F(ES)=ON, or not. If the engine-start flag is down, i.e., F(ES)=OFF, meaning that the engine is not started, then the control flow ends here.

Conversely, if the result of the determination at Step S22 is that the engine-start flag is up, i.e., F(ES)=ON, then the engine E is started in an ignition retardation (that delays the ignition timing) for keeping the output of the engine E at a low level at Step S23. The engine E is operated in the ignition retardation until a determination at Step S24 gives a result that the preparation for the engagement of the clutch is complete.

On the other hand, a linear solenoid valve, which is provided in the control valve CV to produce the clutch pressure Pc supplied to the starting clutch 5 through the oil passage 33, is actuated at time t0, when the engine-start flag is set up, i.e., F(ES)=ON, and controlled thereafter. Because the engine E is operated in the ignition retardation after time t0, the hydraulic pump P is driven through the chain mechanism CM by the rotation of the output shaft Es of the engine. As a result, the oil discharged from the pump P is supplied to the control valve CV, which is then supplied from the linear solenoid valve through the oil passage 33 to the starting clutch 5. When the oil passage 33 and the oil chamber of the starting clutch 5 are filled with the oil, a determination at Step S24 results in that the engagement preparation for the starting clutch 5 is complete (time t2).

After the completion of the engagement preparation of the starting clutch 5 (time t2), the control flow proceeds to Step S25, where a control for removing the ignition retardation is executed, so that the engine E will operate normally (the ignition timing is returned to the original). This control, after the elapse of the time set on a timer for the determination of the engagement preparation completion from time t2, i.e., at time t3, increases the output of the engine E and sets the idling stop flag down, i.e., F(IS)=OFF, at Step S26. Thereafter, the rotational speed of the engine E increases in correspondence to the pressing of the accelerator pedal as shown in FIG. 6. In this instance, if the driving force of the engine is not sufficient, then the engine E is assisted by the electrical motor generator M to secure a desired starting performance at Step S28.

After the completion of the engagement preparation of the starting clutch 5 at time t2, the linear solenoid valve receives a control signal that increases the clutch pressure rapidly as shown in FIG. 6 at Step S27. This is to quickly clear the invalid stroke of the piston in the starting clutch 5. As a result, the starting clutch 5 is cleared of the invalid stroke to start the real engagement. Thereafter, the clutch pressure is controlled to increase gradually as shown in the time diagram.

The control to start the engine, which has been stopped in the idling elimination control, is executed in the above described steps, namely, at first, the engine E is started in an ignition retardation with its output being subdued, and after the completion of the engagement preparation of the starting clutch 5, the engine is released of the ignition retardation to increase its output while the starting clutch 5 is being engaged. In this way, the starting clutch 5 is engaged smoothly without engine racing, so that the vehicle is started smoothly. In the above described control, the engine E is released of the ignition retardation after the completion of the engagement preparation of the starting clutch 5. Instead, the engine E may be started when the invalid-stroke clearing of the starting clutch 5 is completed.

The above embodiments are described in relation to the engagement control of the starting clutch 5. However, the present invention is not limited to the control of the starting clutch 5. The present invention can be applied in the same way also to the forward clutch 25 and the reverse brake 27. In the above embodiments, a continuously variable transmission with a metal V-belt mechanism 10 is used as an example, but any other type of continuously variable transmission or a gear-type automatic transmission may be equally used instead.

As described above, according to a feature of the present invention, to start the engine, which has been stopped in an idling elimination control, for starting the vehicle, at first, a hydraulic pump, which is connected to the output shaft of the engine, is driven by an electrical motor without any fuel supply to the engine, so that oil discharged from the pump is supplied to a frictionally engaging element. After the frictionally engaging element receiving the oil becomes ready for a power transmission, the engine is started. Through the frictionally engaging element, which has started engaging, the output of the engine is transmitted to wheels, so that the vehicle is started. In this way, the vehicle is started smoothly without engine racing. In this case, the electrical motor is used to drive the pump and to drive the engine idly, so the electrical motor must provide the driving torque that is the sum of the pump driving torque and the engine friction torque. The required torque is not so large as to heat up the electrical motor, so the size of the electrical motor can be made small. Moreover, if the operation of the electrical motor is continued even after the start of the engine, then the electrical motor can be controlled to assist the engine for an improved driving performance of the vehicle. In this control, no fuel is supplied at the start of the engine, so the fuel efficiency of the vehicle is relatively high.

For starting the vehicle, whose engine has stopped in the idling elimination control, it is preferable that the suction and exhaust valves be kept closed while the hydraulic pump is being driven by the electrical motor. In this way, no fresh air is allowed into the cylinders while the output shaft of the engine is driven by the electrical motor. This helps the engine to keep the exhaust gas clean when the engine is activated. Furthermore, because the suction and exhaust valves are closed, the pumping loss, which would occur in a large amount if the air were allowed to flow through the passages of the suction and exhaust valves as the pistons reciprocate in the cylinders, is maintained at a small amount. This leads to an improved fuel efficiency. In addition, because there is no opening and closing of the suction and exhaust valves, the vibration of the engine is relatively small.

According to another feature of the present invention, to start the engine, which has been stopped in the idling elimination control, for starting the vehicle, at first, the engine is started in an ignition-timing shift (for example, a delay in the ignition timing) so as to limit the output of the engine to a reduced level. As a result, the engine starts without any engine racing, and a hydraulic pump driven by the engine discharges oil, which is supplied to a frictionally engaging element. After the frictionally engaging element receiving the oil becomes ready for a power transmission, the ignition timing of the engine is reset to the original setting to increase the output of the engine to a normal level, so that the vehicle can be controlled to start smoothly. In this case, the rotational speed of the engine is controlled in correspondence to the operation of the accelerator pedal, so the driver feels no abnormality from the operation.

In this power-transmission control system, an electrical generator may be provided to the engine rather than to the frictionally engaging element, so that while the engine is being operated in the ignition-timing shift, the electrical generator being driven by the engine can generate electricity. With this arrangement, as the engine, having started in the ignition-timing shift with a reduced output, is further restrained by the load of the electrical generator to generate electricity, the engine is securely protected from engine racing. In this case, when the frictionally engaging element receiving oil discharged from the hydraulic pump actually starts its engagement, the ignition timing of the engine is reset to the original setting, and the generation of electricity by the electrical generator is terminated. Because the output of the engine is reset to the original normal condition, the vehicle can be controlled to start smoothly. As the electrical generator is driven by the engine with a reduced output, the electrical generator never heats up excessively, so the switching of the electrical generator for the termination of electricity generation is performed smoothly. Also, in this arrangement, the rotational speed of the engine is controlled in correspondence to the operation of the accelerator pedal, so the driver feels no abnormality.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.2001-318946 filed on Oct. 17, 2001 which is incorporated herein by reference.

What is claimed is:

1. A vehicular power-transmission control system comprising:
an engine, which can be stopped when a vehicle comes into a halt in an idling elimination control;
a drive-power transmission, which transmits a rotational driving force from said engine to wheels;
a hydraulically actuated frictionally engaging element, which controls transmission of the rotational driving force in said drive-power transmission;
an electrical motor, which is provided closer to said engine than to said frictionally engaging element and which assists said engine in rotational drive;
a hydraulic pump, which is connected to an output shaft of said engine and which supplies an engagement-actuating pressure to said frictionally engaging element; and
control means for controlling said engine;
wherein:
after said engine has stopped because of said vehicle having come into a halt in the idling elimination control, to restart said vehicle, said engine is driven to rotate the output shaft with only a small limited output torque, so as to drive said hydraulic pump; and
when said frictionally engaging element receives a hydraulic pressure from said hydraulic pump and becomes ready for a transmission of power, said engine is operated to produce a torque.

2. The vehicular power-transmission control system as set forth in claim 1, wherein:

said control means controls said engine such that, when said vehicle, which has come into a halt with said engine consequently stopped in the idling elimination control, is to be restarted, an engine output is reduced by not allowing fuel supply to said engine;

the output shaft of said engine is driven and rotated by said electrical motor to drive said hydraulic pump; and when said frictionally engaging element receives the hydraulic pressure from said hydraulic pump and becomes ready for a transmission of power, the fuel supply to said engine is restarted, so that said engine is operated to produce a torque.

3. The vehicular power-transmission control system as set forth in claim 2, wherein:

said engine comprises a suction valve and an exhaust valve for each cylinder thereof, said suction valve and said exhaust valve capable of being kept closed; and when said vehicle, which has come into a halt with said engine consequently stopped in the idling elimination control, is to be restarted, while said hydraulic pump is being driven by said electrical motor in operation, at least some of said suction and exhaust valves are kept closed.

4. The vehicular power-transmission control system as set forth in claim 2, wherein:

while said engine output is reduced to not allow a fuel supply to said engine, and while the output shaft of said engine is being driven and rotated by said electrical motor to drive said hydraulic pump, said control means controls said electrical motor to increase a rotational speed of the output shaft of said engine gradually to an engine-idling rotational speed and then to maintain the rotational speed of said engine at this engine-idling rotational speed.

5. The vehicular power-transmission control system as set forth in claim 1, wherein:

said control means controls said engine such that, when said vehicle, which has come into a halt with said engine consequently stopped in the idling elimination control, is to be restarted, said engine is started in a condition where an engine output is reduced by an ignition-timing shift; and when said frictionally engaging element receives the hydraulic pressure from said hydraulic pump and becomes ready for a transmission of power, the ignition timing of said engine is reset to a normal condition, so that said engine is operated to produce a normal torque.

6. The vehicular power-transmission control system as set forth in claim 5, further comprising an electrical generator, which is provided closer to said engine than to said frictionally engaging element and driven by said engine to generate electricity;

wherein:

while said engine is being operated in the ignition-timing shift, said electrical generator is driven by said engine to generate electricity.

7. The vehicular power-transmission control system as set forth in claim 1, wherein:

said hydraulic pressure from said hydraulic pump to said frictionally engaging element is supplied through a linear solenoid valve; and a condition where said frictionally engaging element has become ready for a transmission of power is detected from a counter electromotive force that is generated in a solenoid of said linear solenoid valve in response to a change in the hydraulic pressure being supplied to said frictionally engaging element.

* * * * *